Oct. 21, 1969 G. STOLAR 3,474,338
PROJECTED INDICATION INSTRUMENT WITH REMOVABLE LAMP HOUSING
Filed Aug. 18, 1965 2 Sheets-Sheet 1

Gerald Stolar
INVENTOR
BY John E. Holder
ATTORNEY

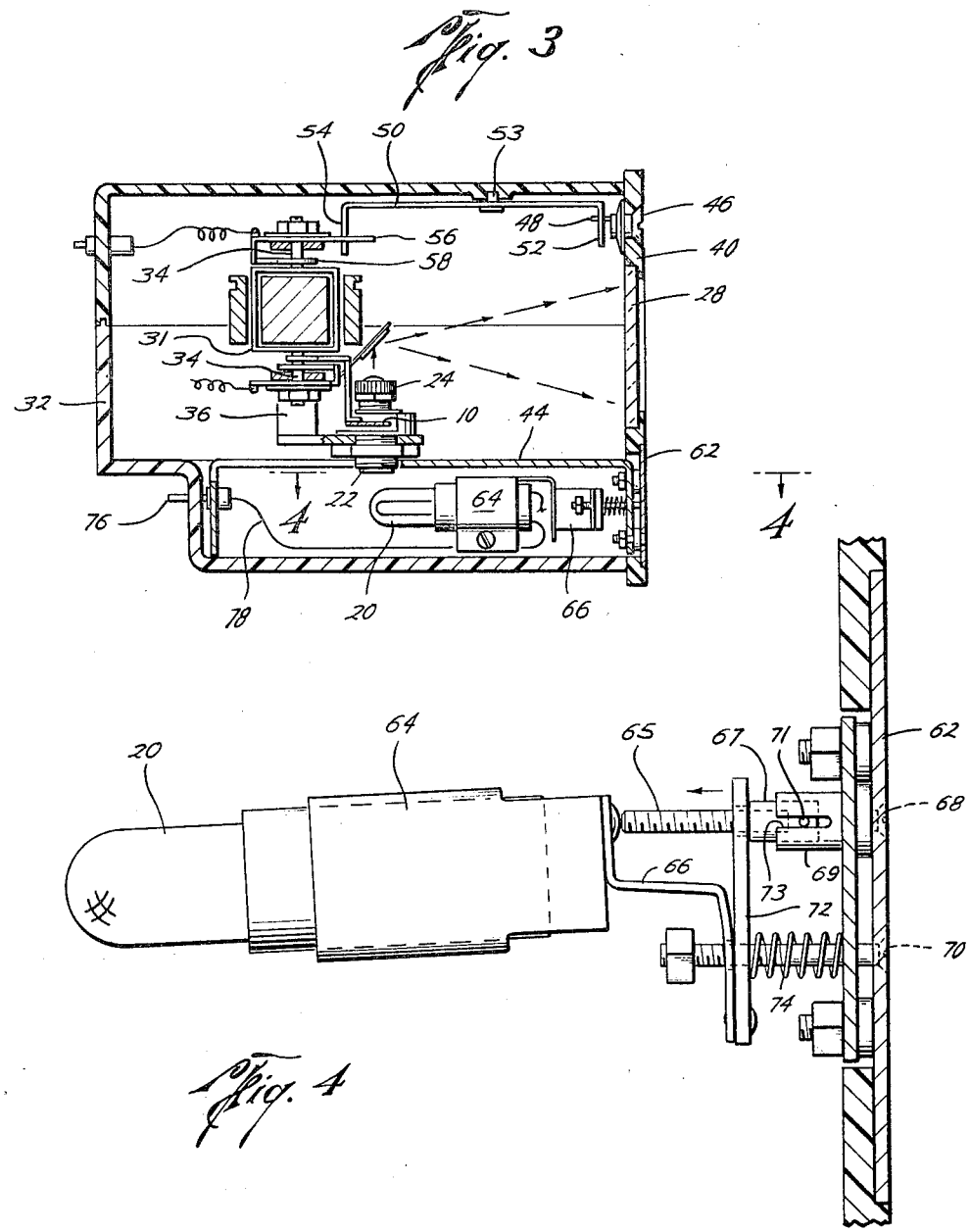

United States Patent Office 3,474,338
Patented Oct. 21, 1969

3,474,338
PROJECTED INDICATION INSTRUMENT WITH REMOVABLE LAMP HOUSING
Gerald Stolar, Linden, N.J., assignor, by mesne assignments, to Weston Instruments, Inc., Newark, N.J., a corporation of Delaware
Filed Aug. 18, 1965, Ser. No. 480,740
Int. Cl. G01r 13/38, 31/40
U.S. Cl. 324—97      4 Claims

ABSTRACT OF THE DISCLOSURE

An instrument and housing is shown in which a front panel includes a viewing window and a removable plate below the window. A rotatable meter movement within the housing carries a calibrated strip which is movable with the meter movement. A lamp is adjustably carried by a bracket fastened to the removable plate, allowing removal of the lamp and bracket from the front of the housing. Light from the lamp is directed through the calibrated strip by objective and projection lenses and is directed onto the screen by a mirror, providing a viewable image of a portion of the strip.

---

This invention relates to electro-optical measuring instruments and, more particularly, to a compact optical projection measuring the instruments of the D'Arsonval type.

It is often desirable to mount measuring instruments in groups or banks to permit observation of such instruments from a single vantage point. This is particularly true where remote television is used to observe instrument readings.

In order to effectively group instruments in this manner, it is necessary to house the instruments in a compact package. Additionally, if observation of the instruments is to be made from a single position, it is desirable to eliminate parallax error in reading the group of instruments from such a single vantage point. In maintaining instruments which are grouped close together or which may be arranged in a larger panel or housing, it is convenient to replace light bulbs, adjust the meter movement, etc., from the front face of the instrument.

It is, therefore, an object of the present invention to provide a new and improved optical projection measuring instrument which is compact in construction, and permits maintenance and adjustment from its front face.

Briefly, the present invention contemplates a novel optical read-out system for use in D'Arsonval meter movements or the like. The system includes a rotatable scale having opaque and transparent areas arranged thereon in accordance with a suitable scale pattern. The scale is fixedly secured to the free end of an arm. The arm is fixedly mounted on a coil which is rotatable in dependence on the quantity of electricity flowing through it. To read out the information contained on this scale, means are provided including a light source for projecting a narrow beam of light onto the scale. The scale transmits a portion of the beam to an image plane for indicating the annular displacements of the rotatable coil by imaging various portions of the scale. A screen is arranged in the image plane and a stationary fine reference line may be placed in the screen. The coil's exact position may be accurately ascertained by reading the character of the scale in coincidence with the reference line. The instrument mechanism is so arranged that the light source is conveniently removable from the front face of the instrument housing. In addition, a calibrating adjustment may be made from the front of the instrument housing to change the position of the instrument scale. The position of the light source in the optical system may also be adjusted from the front face of the housing. The invention will now be described in more detail in connection with the accompanying drawings in which:

FIG. 3 is a cross-sectional view in elevation of the meter movement and projection mechanism; and FIG. 4 is a view of the lamp taken along line 4—4 of FIG. 3.

Figures 1, 2:
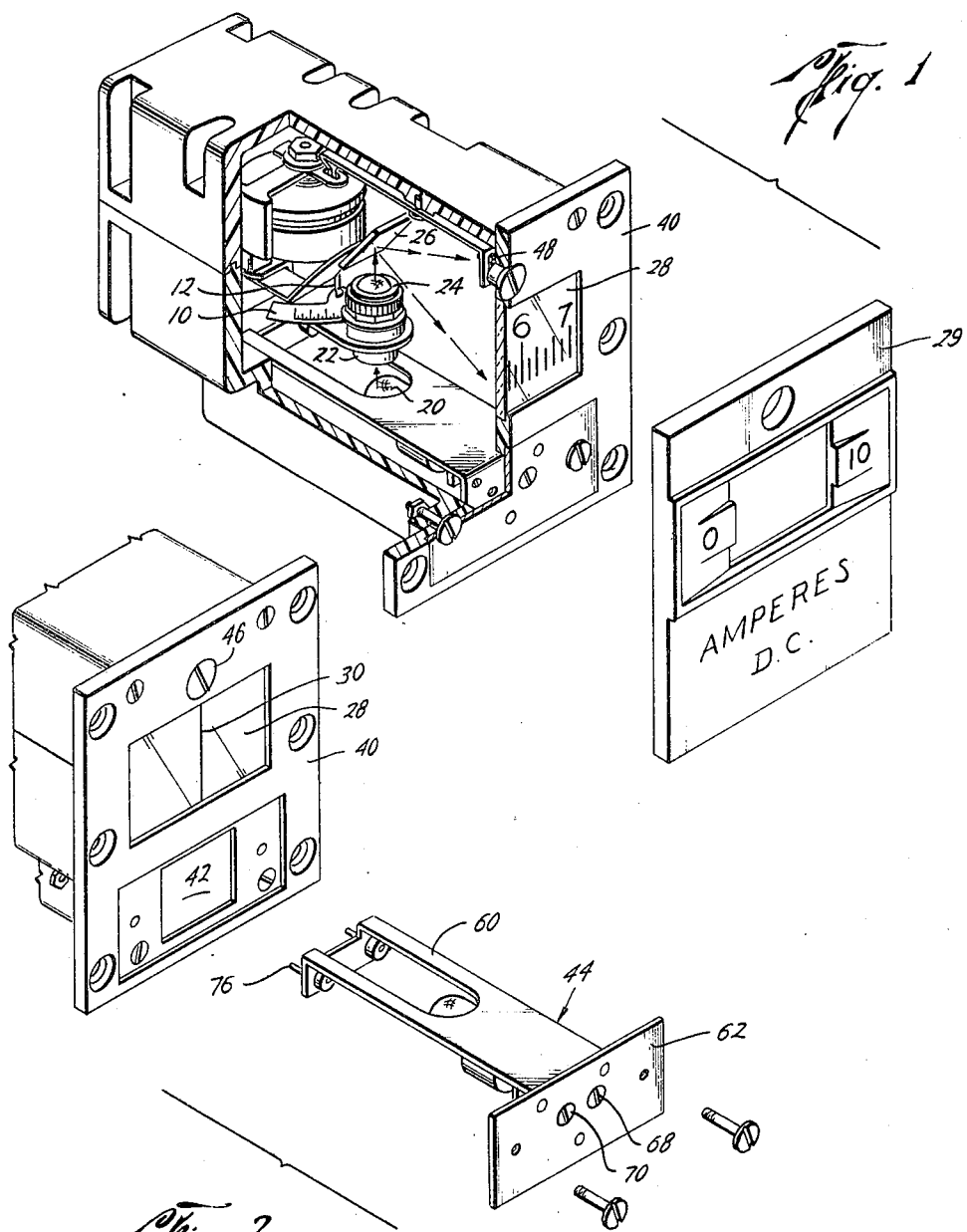
FIG. 1 is an isometric cut-away view of an instrument embodying the features of the present invention.
FIG. 2 is an isometric view of the front portion of the instrument housing showing in particular a removable lamp shelf.

Referring first to FIG. 1, the instrument read-out system according to the present invention includes a scale 10 mounted on an arm 12. The arm is fixed to a rotatable member such as a coil of a conventional D'Arsonval meter movement. In a preferred embodiment, the scale 10 is an arcuate flat member mounted in a horizontal plane and is made of thin metal which bears the negative of a desired scale pattern. The scale 10 is characterized as having opaque and light transmitting areas arranged in a desired pattern. The pattern is typically a digital scale having digits or numbers with subdivision lines therebetween. It should be apparent, however, that the geometry of the scale and of the pattern is entirely arbitrary. A light source 20 and a condenser lens 22 are arranged to project a beam of light onto the scale 10. A portion of the light beam is transmitted by the scale 10 onto another lens 24 and then is reflected by a suitable prism member 26 or the like onto a screen 28 to present an image plane. The screen 28 is preferably made of plastic or glass. A thin reference line 30 (FIG. 2) is disposed on one face of the screen 28. A snap-on face plate 29 may be provided to permit a variety of scale limits or other indicia to aid in the reading of the projected scale.

Details of the instrument system are better described with reference to FIG. 3 which shows the system mounted within a housing 32. The D'Arsonval meter movement 31 is arranged on the housing so that the shafts 34 which rotatably support the moving coil are vertical to eliminate pivot roll. The shafts 34 serves as electrical leads to the coil 31. The arm member 12 is attached to the shaft 34 and projects outwardly and downwardly therefrom. The scale 10 is mounted on the arm 12 to move in an arcuate horizontal path upon rotation of the shaft 34.

A bracket 36 on the housing supports the condenser lens 22 which is positioned below the movable scale 10. Also attached to the bracket is the projection lens 24 which is positioned on the opposite side of the movable scale and in vertical alignment with the condenser lens. The mirror or prism member 26 is positioned above the projection lens with the face of the mirror at a 45° angle to a vertical line through the lenses 22 and 24.

Referring now to FIG. 2, a front panel member 40 is mounted to one end of the instrument with the translucent viewing window 28 mounted therein. A rectangular opening 42 at the bottom of the front panel member is sized to receive a lamp tray 44. Above the window is an adjustment screw 46 which is rotatably mounted in the panel. An extending pin 48 (FIG. 3) which is eccentrically located on the end of the screw projects through the panel. An arm member 50 is attached by means of a coil spring to the shaft 34 of the meter movement. The arm member 50 extends outwardly therefrom to a point adjacent the front panel 40 and is pivotally held in such position by means of a pin 53. One end of the arm 50 has a bent portion 52 which is slotted to receive the eccentric pin 48 on the adjusting screw 46. The other end of the arm 50 has a bent portion 54 in the shape of a pin which is received within a slotted member 56. A coil spring 58 connects member 56 to the shaft 34.

The lamp tray 44 is comprised of a horizontal lamp support member 60 connected to a vertical front plate 62. A lamp support bracket 64 is connected to the front plate by means of a flexible metal member 66. A pair of adjusting screws 68, 70 extend through the front plate for making adjustments in the position of lamp 20. A nut 67 is threadedly received about a bolt 65. A sleeve 69 is connected to the screw 68 and is rotatable therewith. A pin 71 extends from the nut 67 and is received within a slot 73 in the sleeve 69. Rotation of the screw 68 and sleeve 69 is transmitted by pin 71 to the nut 67 wherein the nut travels back and forth on bolt 65 to move against a bracket 72. Screw 70 is threadedly received in the bracket 72 which in turn is connected to one end of a flexible member 66. A spring 74 urges the bracket 72 outwardly from the front plate 62. By manipulating the screws 68 and 70, the lateral position of the lamp 20 may be changed with respect to the optical system. Contacts 76 on the rear end of the lamp tray 44 provide for the connection of electrical wires 78 to the lamp 20.

In the operation of the apparatus herein described the D'Arsonval meter is connected in an electrical circuit wherein the moving coil 31 of the meter is affected by changes in the electrical parameters of such circuit. The coil is rotated in response to such changes to move the arm 12 and attached scale 10 in an arcuate path between the lenses 22 and 24. Light emanating from the lamp 20 passes through the condenser lens 22 which concentrates the light on the moving scale. The scale passes a portion of the light in the form of an image of a character on the scale. The image is projected by lens 24 onto the mirror 26 which, in turn, reflects the image onto the translucent screen 28 at the front of the instrument. Depending upon the position of the scale 10, a portion of the scale will appear in coincidence with the reference line on the screen. The coil's exact position will be determined by reading the character nearest the reference line.

Normally, the reference line 30 represents the coil's zero position. The zero position may be adjusted by turning the screw 46 at the top of the front panel. Turning of the screw rotates the eccentric pin 48 within the slotted portion of arm 50. The arm, in turn, is pivoted about pin 53 to tension the spring 58 connected between the other end 54 of the arm and the shaft 34 of the meter movement.

What is claimed is:

1. An electrically operated visual indicating device comprising: a mounting block having a front portion with a viewing window, an instrument movement carried by said mounting block, said instrument movement including a moving coil, an arcuate projection strip having image producing means thereon, means for supporting said projection strip for movement with said coil, an optical projection system including a lamp, and a pair of lenses optically disposed on opposite sides of said projecting strip for projecting light from said lamp to form an image on said viewing window, said image being determined by the position of said image producing means carried by said movable projection strip, an aperture in said front portion of said mounting block, lamp mounting means for carrying said lamp, said lamp mounting means being movable through said aperture and accessible from the front of the indicating device, and means accessible from the front portion of said mounting block for adjusting the position of said lamp with respect to said lenses.

2. A visual indicating instrument comprising the combination of an instrument housing having a front wall and a plurality of side walls extending rearwardly from said front wall, said front wall having a viewing window and a removable portion; a rotatable mechanism mounted within said housing for rotation about an axis substantially parallel to said front wall; a projection strip having image producing means thereon; means for supporting said projection strip for movement with said rotatable mechanism; a lamp; bracket means for supporting said lamp on said removable portion of said front wall, said bracket means and said lamp being extractable through said front wall when said removable portion is removed, said bracket means including means for adjusting the position of said lamp within said housing; first optical means for directing light from said lamp to said projection strip; and second optical means for directing light from said projection strip to said display window to form an image thereon.

3. Apparatus according to claim 2 wherein said projection strip is arcuate and light conducting, and wherein said lamp and said first optical means are disposed on one side of said strip and said second optical means is disposed on the other side of said strip.

4. Apparatus according to claim 3 wherein said first optical means comprises a condenser lens and said second optical means comprises a projection lens and a mirror.

References Cited

UNITED STATES PATENTS

| | | | |
|---|---|---|---|
| 2,599,005 | 6/1952 | MacGeorge | 324—97 X |
| 3,217,253 | 11/1965 | Welsh | 324—151 |
| 3,317,836 | 5/1967 | Welsh | 324—97 |
| 3,333,191 | 7/1967 | Triplett | 324—97 X |

ALFRED E. SMITH, Primary Examiner